(No Model.) 2 Sheets—Sheet 1.
R. C. SINCLAIR & J. HODSON.
APPARATUS FOR EFFECTING THE TURNING OF MALT OR GRAIN.
No. 379,136. Patented Mar. 6, 1888.
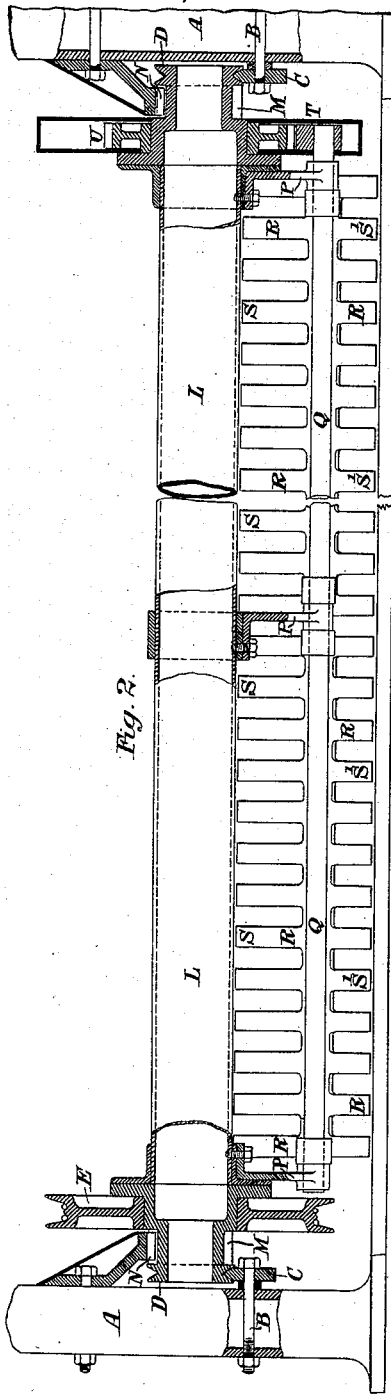
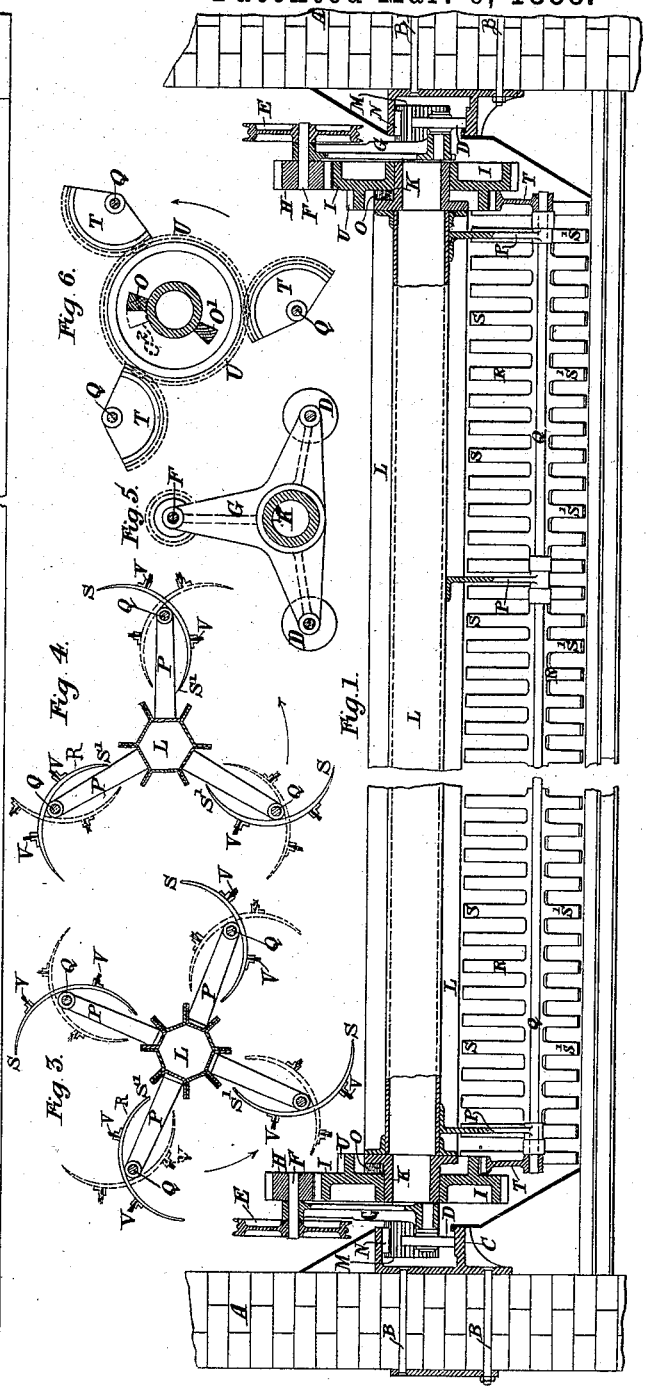
Witnesses:
David F. Williams
William D. Conner
Inventors:
Robert C. Sinclair &
John Hodson
by their Attorneys
Howson and Sons (No Model.) 2 Sheets—Sheet 2.
R. C. SINCLAIR & J. HODSON.
APPARATUS FOR EFFECTING THE TURNING OF MALT OR GRAIN.
No. 379,136. Patented Mar. 6, 1888.
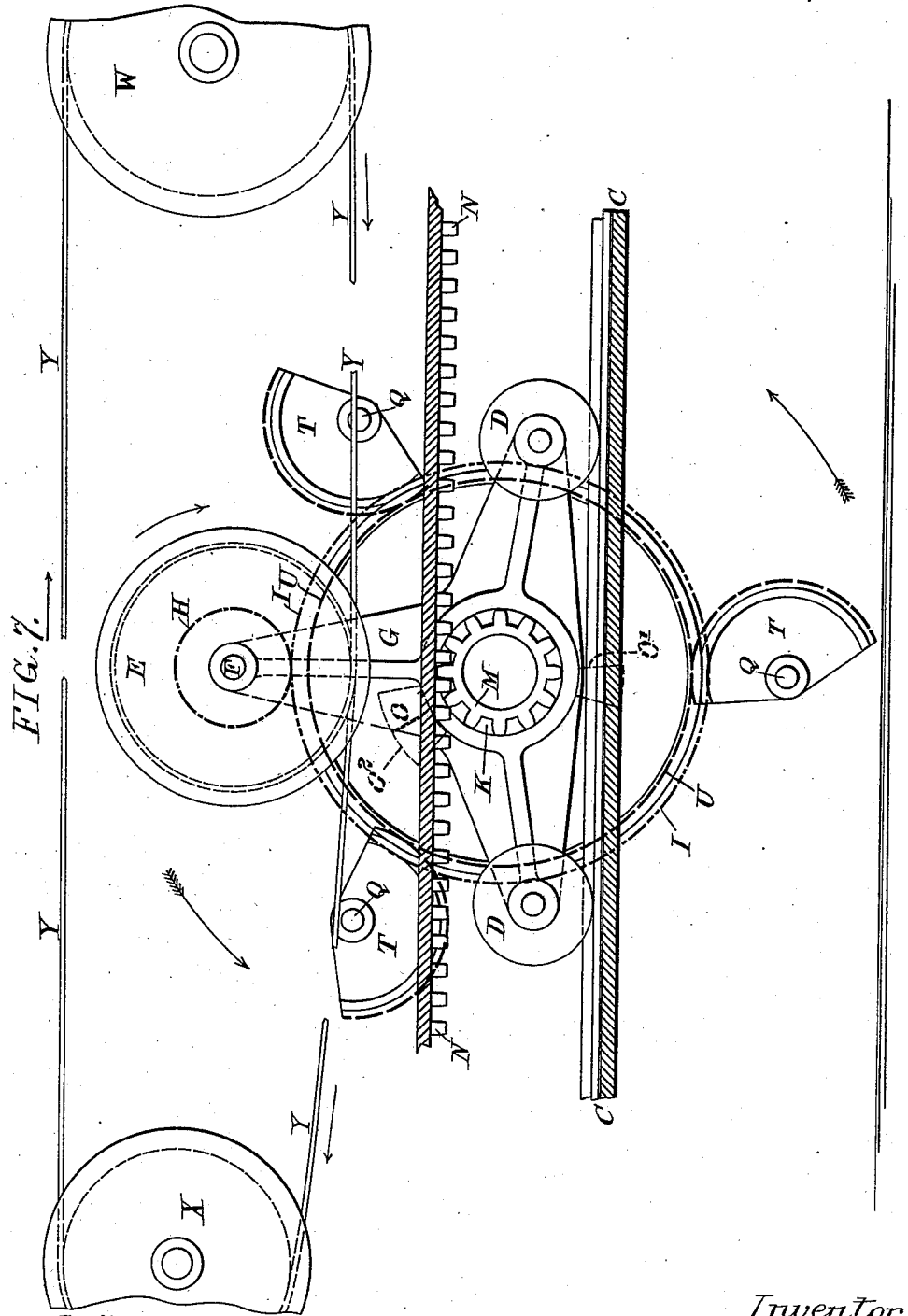

UNITED STATES PATENT OFFICE.

ROBERT COOPER SINCLAIR, OF LONDON, AND JOHN HODSON, OF BURTON-ON-TRENT, COUNTY OF STAFFORD, ENGLAND.

APPARATUS FOR EFFECTING THE TURNING OF MALT OR GRAIN.

SPECIFICATION forming part of Letters Patent No. 379,136, dated March 6, 1888.

Application filed October 2, 1886. Serial No. 215,178. (No model.) Patented in England July 29, 1885, No. 9,098.

*To all whom it may concern:*

Be it known that we, ROBERT COOPER SINCLAIR and JOHN HODSON, brewers engineers, subjects of the Queen of Great Britain and Ireland, and residing, respectively, ROBERT COOPER SINCLAIR at 3 Adelaide Place, in the city of London, England, and JOHN HODSON at Clarence Street Brewery, Burton-on-Trent, in the county of Stafford, England, have invented certain new and useful Apparatus for Effecting the Turning of Malt or Grain on the Drying-Floors of Kilns, (for which we have applied for a patent in Great Britain on the 29th of July, 1885, No. 9,098,) of which the following is a specification.

This invention relates to certain improvements in apparatus in which rakes or scoops, or both rakes and scoops, are employed for disintegrating, loosening, and turning over the germinated grain, brushes being fixed between the rakes or scoops for the purpose of removing any grain from the floor of the kiln not acted upon by the said rakes or scoops.

We mount in arms on the rotating shaft the rods or spindles carrying the scoops or rakes, which, according to our invention, are formed with two operating-edges and are mounted on the said spindles so as to be free to turn therein. Each rake or scoop is provided with two brushes, one to each operating edge, and so arranged that in whichever direction the shaft is being rotated the brushes will operate to remove from the kiln-floor any of the malt or grain that may not have been acted upon by the rakes or scoops. The scoops or rakes may be automatically reversed when the motion of the shaft is reversed by providing each of the spindles on which the said scoops or rakes are mounted with a toothed wheel or segment arranged to gear with a corresponding wheel mounted loosely on the rotating shaft, the said wheel being provided with two pins or projections, one or other of which, according to the direction in which the said wheel is rotated, engaging a pin, arm, or projection on the rotating shaft, and thus imparting motion to the said shaft.

When the motion of the apparatus is reversed, the wheel on the main shaft is caused to turn, while the shaft itself remains stationary, until one of the projections on the wheel engages with the projection on the said shaft, and during the time that the said projection on the wheel is moving before it engages the projection on the shaft the spindles which carry the scoops or rakes are caused to rotate by reason of the wheels or segments thereon gearing with a wheel on the shaft, thus causing the position of the operating-edges of the rakes or scoops to be reversed, the edges thereof which were out of action being brought into position to operate on the grain and the edges which were in action being brought above the surface of the grain being operated on. It is obvious that the arrangement of the projections referred to may be reversed—that is to say, the wheel on the main shaft may have one projection and the shaft be provided with two projections.

In the accompanying drawings, Figure 1 represents in sectional elevation an improved apparatus as arranged to travel to and fro over the drying-floor of a malt-kiln, and Fig. 2 is a similar view of an apparatus as applied to the germinating-floor of a malt-house. Figs. 3 and 4 are transverse sections illustrating modifications in the construction of the main rotating shaft of the apparatus. Fig. 5 is an elevation of one of the end frames, and Fig. 6 illustrates an arrangement for automatically reversing the rakes, and Fig. 7 is a sectional view drawn to an enlarged scale and illustrating the manner of driving the apparatus.

Referring to Fig. 1, A represents the two opposite walls of a malt-drying kiln, to which are secured by bolts B rails C, upon which the apparatus is supported and caused to travel to and fro over the floor of the kiln, as hereinafter described.

The apparatus is provided at both ends with running-wheels D (see Figs. 5 and 7) and with driving mechanism, to which motion is imparted from any suitable prime mover by means of straps or cords passing round drums or pulleys E, fast on one end of short axles F, mounted in bearings in the end frames, G, of the apparatus, the opposite end of each of the said axles having fast thereon a spur-pinion, H, in gear with a corresponding wheel, I, mounted loosely on a collar, K, fast on the main rotating shaft L of the apparatus. The prime mover is situated at one end of the kiln or malt-house, and an endlesss rope or strap, Y, Fig. 7, from a pulley, W, on the motor passes round the pulley E on the traversing apparatus with its reversible rakes. The rope or strap thence passes around an idler or carrier pulley, X, at the opposite end of the kiln or malt-house, and thence back to the pulley W, as indicated by the arrows in Fig. 7. On each end of the shaft L is keyed a spur-pinion, M, in gear with a rack, N, formed in one with the rail C, or otherwise securely fixed to the wall of the kiln, so that upon rotating the shaft L the apparatus will be caused to travel along the rails C. Motion is imparted to the shaft L from the wheels I by means of projections O O' thereon (see Fig. 6) engaging with corresponding projections, O², on the collar K.

On the shaft L are arms P, Figs. 1, 3, and 4, carrying the spindles Q, upon which the scoops or rakes R are mounted, which scoops or rakes are caused to rotate with the shaft L and operate on the grain placed upon the floor of the kiln, so as to disintegrate and turn it over and over as the apparatus travels along the rails C.

The rakes R, which are preferably of a curved form, are mounted at about their centers upon the spindles Q, and are formed with two operating ends or edges, S S', which are alternately brought into action as the direction of motion of the apparatus is altered. When the apparatus has completed its traverse in one direction, its motion may be automatically reversed by any suitable means—such, for example, as those employed for reversing planing-machines—whereupon the wheels I will be rotated in the opposite direction upon the collars K, the shaft L remaining stationary until the projections O or O', as the case may be, on the wheels I, which were out of action, engage with the projections O² on the shaft L, whereupon the said shaft will also be caused to rotate and, through the pinions M on the ends thereof gearing with the fixed racks N, traverse the apparatus along the rails C in the opposite direction.

The position of the rakes to suit the direction in which the apparatus is caused to travel is effected automatically as follows: On each end of each of the spindles Q, which carry the rakes or scoops R, is keyed a toothed wheel or segment, T, made to gear with a spur-wheel, U, as shown clearly in Figs. 6 and 7, which wheel may be formed in one with the wheel I or made to rotate therewith, so that when the motion of the apparatus is reversed, as hereinbefore described, during the time that the wheel I is turning in the collar before the projections O or O' engage the projection O² on the shaft L, the wheel U, by gearing with the segments T, will impart a partial rotary motion to the spindles Q and bring the ends or edges S of the rakes which were out of action into position for operating on the grain when the apparatus travels along the rails over the floor of the kiln, the said automatic reversing of the rakes taking place at each end of the kiln, or each time the direction of motion of the apparatus is altered. After each reversal the spindles Q, carrying the reversible rakes, are locked to the shaft L and caused to turn therewith by the projection O² bearing against the projections O or O', as the case may be.

Brushes V are fitted to the back of the rakes, which brushes, as the rakes revolve, act upon any of the grain that may have escaped the action of the rakes, so that the whole of the grain is thoroughly disintegrated and turned over and over, and the drying thereof thereby greatly facilitated.

Fig. 2 is a view similar to Fig. 1, illustrating the apparatus as applied to the germinating-floor of a malt-house. The apparatus is similar in construction to that hereinbefore described, but is represented as being driven from one end only, and the end frames, G, are dispensed with, the wheels D, upon which the apparatus travels along the rails C, being fitted upon the main axle L. The rails C are $\wedge$-shaped to fit corresponding grooves in the wheels D, and are secured by bolts B to pillars or columns A, arranged at suitable intervals along the malt-house.

E is the driving-pulley fast on one end of the axle L, which axle is provided with pinions M, in gear with racks N, for effecting the traverse of the machine, as hereinbefore described with reference to Fig. 1. The rakes R are formed with two operating ends or edges, S S', and carried on spindles Q, fitted to turn in arms P, attached to the main axle L, as in the arrangement, Fig. 1. On one end of each of the spindles Q is keyed a segment, T, in gear with a spur-wheel, U, free to turn to a limited extent on the axle L, so that when the direction of motion of the apparatus is reversed the wheel U will, until arrested in its independent motion by projections O² engaging with projections O or O', impart rotary motion to the spindles Q, so as to bring the operating ends or edges of the rakes which were out of action into position for operating upon the grain, the ends of the said rakes which had been previously in operation being raised out of action.

Although we have described and illustrated our invention as applied to a rectangular kiln, it is obvious that it is equally applicable to kilns of a circular or other shape, and that, although we have shown in Figs. 3 and 4, respectively, four and three sets of rakes carried by the axle L, we do not confine ourselves thereto, as any desired number may be employed. Neither do we confine ourselves to the construction of the shafts and other details shown and described; but, Having described and ascertained the nature of our invention, what we claim is—

1. The combination of the rotating shaft of a traversing grain-turning apparatus and reversible rakes or scoops carried by the said shaft with a wheel, U, controlling the said rakes or scoops, and corresponding projections on the wheel and the shaft to transmit motion from the latter to the wheel to reverse the rakes, all substantially as described.

2. The combination of the rotating shaft of a grain-turning apparatus and traveling end frames in which it is mounted, with spindles carried by the shaft and having reversible rakes, a wheel geared to the spindles, projections on the wheel and shaft to transmit motion from the latter to the wheel to reverse the rakes, and mechanism, substantially as set forth, to turn the shaft in its traverse.

In testimony whereof we have signed our names to this specification in the presence of two subscribing witnesses.

ROBERT COOPER SINCLAIR.
JOHN HODSON.

Witnesses to the signature of Robert Cooper Sinclair:
WM. JOHN WEEKS,
PERCY R. GOLDRING.

Witnesses to the signature of John Hodson:
GEO. W. REYNOLDS,
IRA ROWBOTHAM,
*Clerks with Messrs. Moody & Woolley, Solicitors and Notaries Public, Derby, England.*